US006663291B2

(12) United States Patent
Boemmel et al.

(10) Patent No.: US 6,663,291 B2
(45) Date of Patent: Dec. 16, 2003

(54) CONNECTOR ASSEMBLY HAVING AN IMPROVED CONNECTOR POSITION ASSURANCE MECHANISM

(75) Inventors: Christian Otto Boemmel, Langen (DE); Dietrich Wilhelm Kuempel, Ginsheim-Gustavsburg (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 10/081,450

(22) Filed: Feb. 20, 2002

(65) Prior Publication Data

US 2002/0136499 A1 Sep. 26, 2002

(30) Foreign Application Priority Data

Feb. 21, 2001 (DE) ........................................ 101 08 285

(51) Int. Cl.[7] .................................................. G02B 6/36
(52) U.S. Cl. .......................................... 385/53; 439/347
(58) Field of Search .............................. 385/53, 55, 92; 439/347, 352

(56) References Cited

U.S. PATENT DOCUMENTS 5,984,701 A * 11/1999 Sawayanagi et al. ....... 439/157

FOREIGN PATENT DOCUMENTS

| | | | |
|---|---|---|---|
| DE | 44 34 030 A1 | 3/1996 | ........... H01R/13/52 |
| DE | 19604862 A1 | 8/1996 | ......... H01R/13/639 |
| DE | 19532623 A1 | 3/1997 | ......... H01R/13/629 |
| DE | 19852418 A1 | 5/2000 | ......... H01R/13/629 |
| DE | 19929592 A1 | 1/2001 | ............ G02B/6/36 |
| EP | 0 599 780 A1 | 6/1994 | ............ G02B/6/38 |
| EP | 0 625 809 A1 | 11/1994 | ......... H01R/13/629 |

* cited by examiner

*Primary Examiner*—Khiem Nguyen

(57) ABSTRACT

The invention relates to a connector assembly, especially for connecting optical fibers, having a coupling member, a connector housing insertable into the coupling member and a connection slide mounted in the coupling member so as to be actuatable generally perpendicular to the insertion direction of the connector housing. At least one of the components, either the coupling member, connector housing or connection slide includes a resiliently deformable area which is deformable between connection and snap-in positions.

15 Claims, 3 Drawing Sheets

Fig. 1
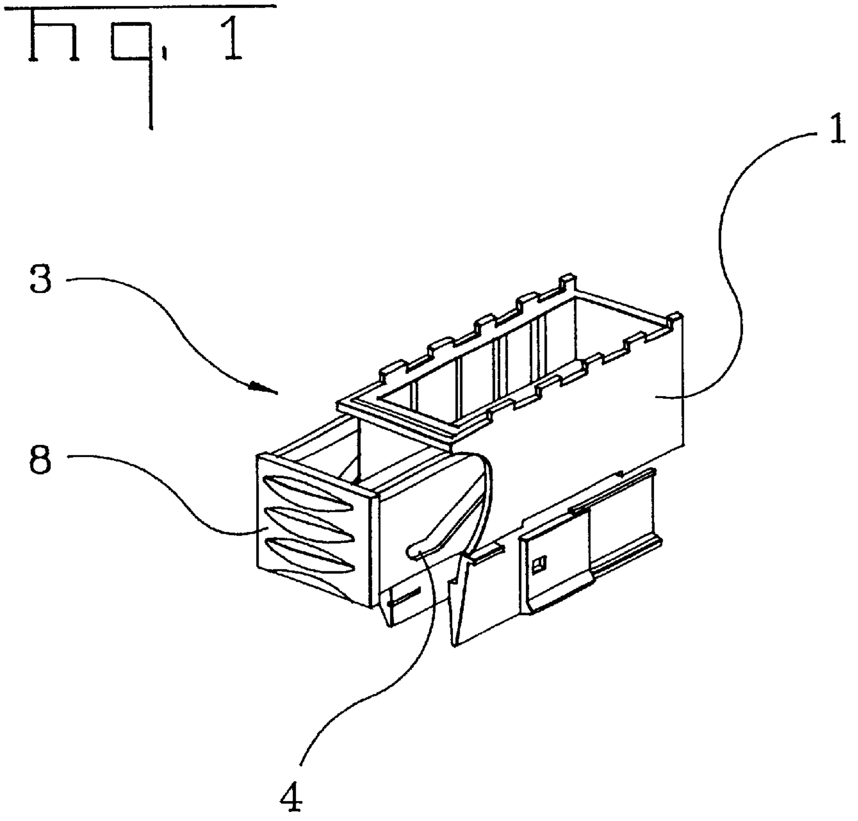
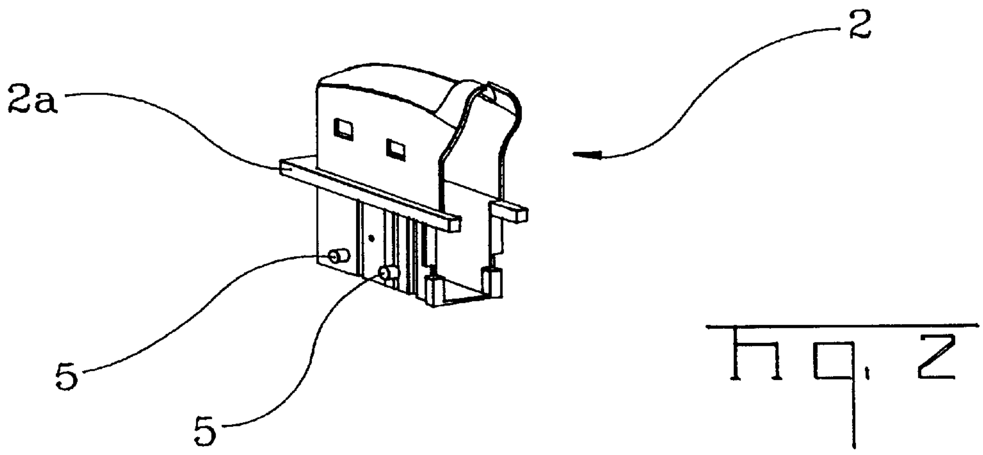
Fig. 2

CONNECTOR ASSEMBLY HAVING AN IMPROVED CONNECTOR POSITION ASSURANCE MECHANISM

FIELD OF THE INVENTION

The invention relates to a connector assembly for connecting optical or electrical conductors having connector position assurance (CPA) mechanism to assure proper positioning of mating connectors in a mated position.

BACKGROUND

Such connector assemblies are known, generally in the electrical industry, for example from patent publications DE 195 32 623 A1 and EP 0 625 809 B1. Since the force required to effect a connection between mating connectors increases with the number of contacts to be connected, mechanical aids, such as for example connection slides displaceable perpendicularly to the insertion direction, are used to simplify mating. These arrangements are know in the industry as connector position assurance (CPA) devices.

Since these arrangements contain a large number of contacts and several parts for the CPA mechanism, dimensional tolerances may cause a problem in that the connector housing may be fully inserted into the coupling member even though the connection slide may still not be fully snapped into the coupling member. If the connection slide is thus not adequately snapped in, loss of electrical or optical contact may occur. An attempt to push the incompletely inserted connection slide into the mating connector may lead to the housing of one of these plastic components being over-compressed and damaged.

If such a connector assembly is used not only for electrical contacts but also for connecting optical fibers, care must be taken to ensure that any gap between the end faces of the optical fibers to be mated is minimized. Since, in contrast to electrical contact, optical fibers have no interlocking contact zone, the end faces of the optical fibers must be positioned as close to one another as possible, and also aligned laterally creating a more difficult positional tolerance situation.

SUMMARY OF THE INVENTION

An object of the invention is to provide a connector assembly to ensure that the distance between the end faces of the optical fibers is minimized and the positional accuracy of the mated fibers is enhanced.

This and other objects are achieved by providing a connector wherein on at least one mating half or connection slide has at least one area constructed to be resiliently deformable upon full actuation of the connection slide.

Having at least one resiliently deformable area on one of these components facilitates the use of the connector assembly for connecting optical fibers. Since, in the case of a optical fiber results in a marked impairment in transmission quality, it is important for the optical fiber end faces to lie as precisely as possible opposite one another and to be only slightly spaced from one another. This is ensured by the resilient area. The connection slide may be inserted into the coupling member as far as the snapped-in position while the resilient area allows the fiber end to be accurately positioned.

BRIEF DESCRIPTION OF THE DRAWINGS

The invention will now be described by way of example with reference to the accompanying figures of which:

FIG. 1 is a perspective view of a coupling member with the connection slide drawn out;

FIG. 3 is a side view of the connection slide according to FIG. 1;

DETAILED DESCRIPTION OF THE PREFERRED EMBODIMENT

Figure 2:
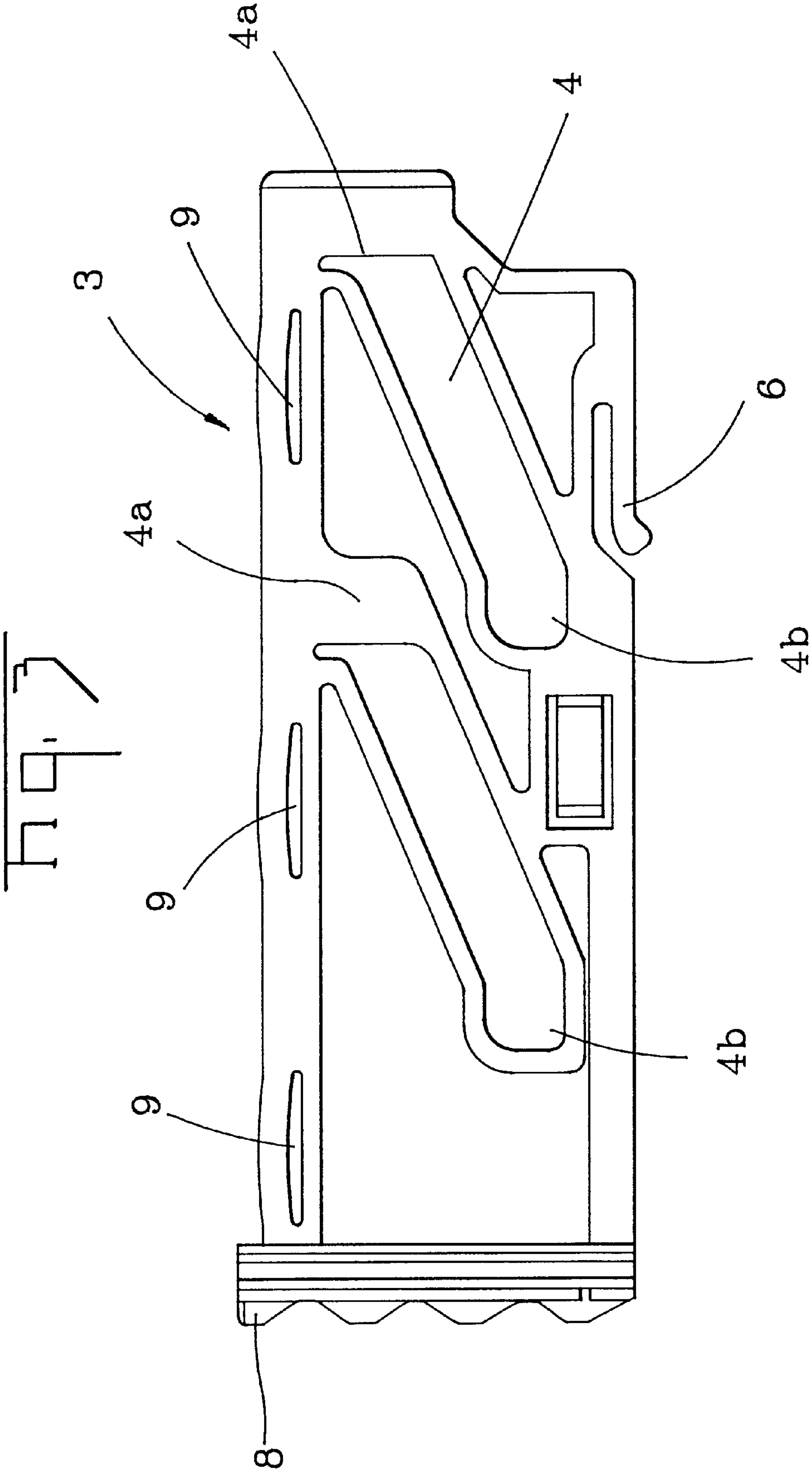
FIG. 2 is a perspective view of a connector housing.

FIG. 1 is a perspective view of a coupling member 1 of a connector assembly. This coupling member 1 serves to accommodate a connector housing 2 having complementary construction according to FIG. 2, which is inserted into the coupling member 1 from above, as shown in FIG. 5.

To simplify mating of the coupling member 1, the coupling member 1 is provided with a connection slide 3. The connection slide 3 is of a substantially U-shaped construction and is mounted in the coupling member 1 so as to be displaceable perpendicularly to the insertion direction of the connector housing 2. As is particularly clear from FIGS. 3 and 4, channels 4 are formed in the side walls of the connection slide 3. The channels 4 each have an open upper end 4*a* and a lower end 4*b*.

When the coupling member 1 and connector housing 2 are mated, pegs 5 formed on the connector housing 2 engage in the channels 4 of the connection slide 3. When the connection slide 3 is then pushed into the coupling member 1, from the drawn-out position shown in FIG. 1 into the snapped-in position shown in FIG. 4, the pegs 5 of the connector housing 2 are guided within the channels 4 until they reach the lower end 4*b* of the channels 4. The connector housing 2 is thus drawn into the coupling member 1 to a contacting position.

Figure 5:
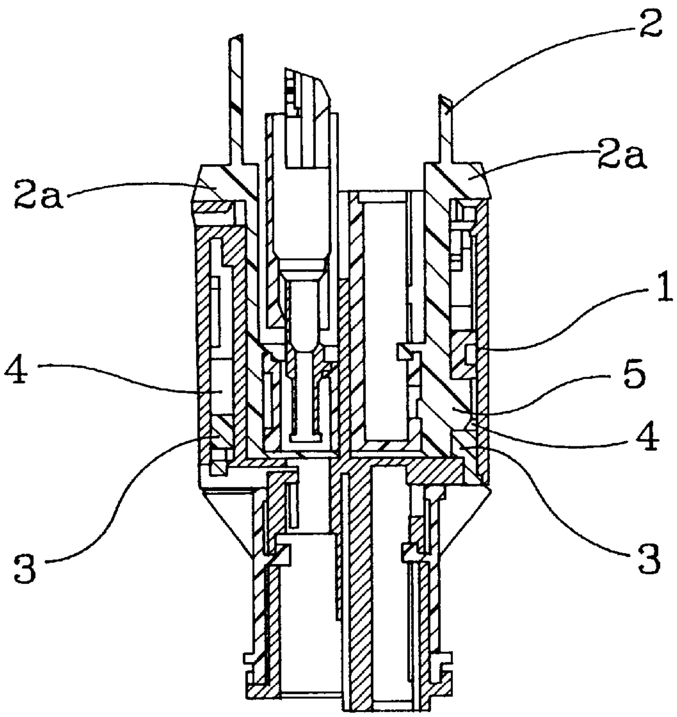

The connector assembly composed of coupling member 1 and connector housing 2 is shown in FIG. 5. The right-hand part of this sectional representation shows clearly how a peg 5 of the connector housing 2 is arranged in the contacting position at the lower end 4*b* of a channel 4 of the connection slide 3. In this contacting position, in which the connector housing 2 has been drawn fully into the coupling member 1 by the connection slide 3, a circumferential rim 2*a* formed on the connector housing 2 lies against the upper edge of the coupling member 1.

Figure 4:
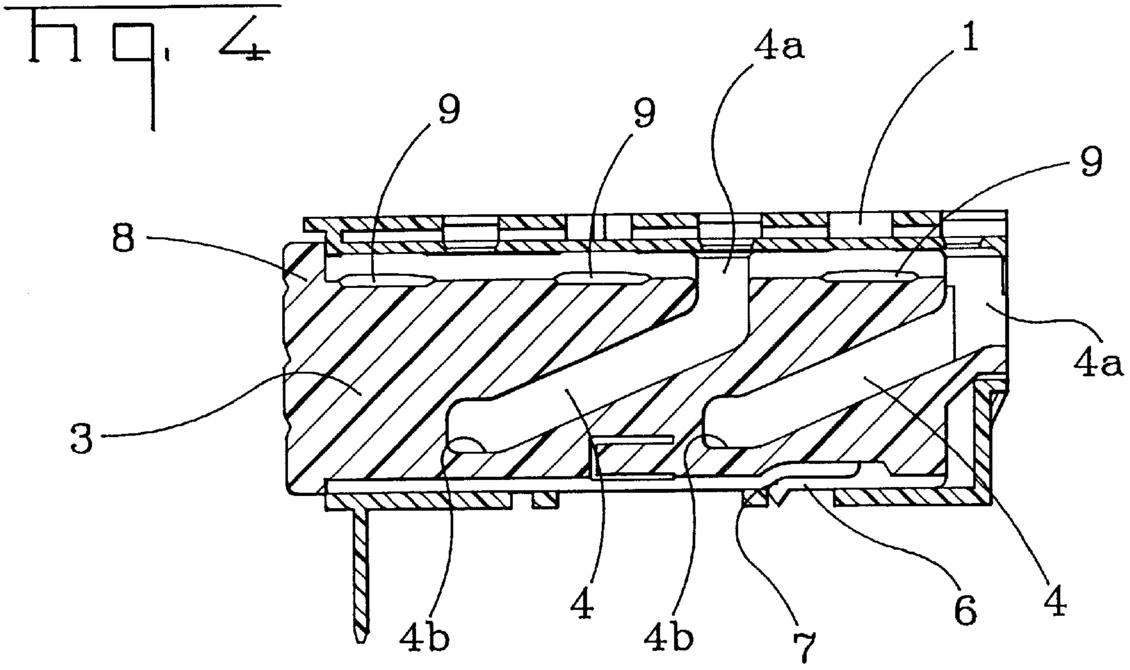
FIG. 4 shows a longitudinal section through the coupling member according to FIG. 1 with the connection slide pushed in and FIG. 5 shows a cross section through an assembled connector assembly according to the invention.

As is clear from FIG. 4, when the connection slide 3 is in the snapped-in position where it is fully inserted into the coupling member 1, a catch 6 formed on the connection slide 3 engages behind a projection 7 inside the coupling member 1, such that the connection slide 3 cannot be extracted from the coupling member 1 without first disengaging the catch hook 6 from the projection 7. In the snapped-in position shown, a front end wall 8 of the connection slide 3 lies against the coupling member 1.

Due to the selected tolerances, a problem may arise where the pegs 5 of the connector housing 2 are in the contacting position already located at the lower end 4*b* of the channels 4 of the connection slide 3 while the connection slide 3 itself has not yet reached the snapped-in position. In order to close the remaining gap between the end plate 8 of the connection slide 3 and the coupling member 1 and to be able to push the connection slide 3 far enough into the coupling member 1 for the catch hook 6 to engage behind the abutment 7, openings 9 forming a flexible bar are formed in the connection slide 3. The connection slide 3 is therefore weakened in such a way that it is resiliently deformable upon pushing in of the connection slide 3. The openings 9 ensure that, despite over-compression of the connection slide 3, none of the components of the connector assembly are damaged.

In addition to the illustrated construction of this resiliently deformable area on the connection slide 3, it is of course also possible to construct these areas on the other components or on a plurality of components of the connector assembly.

With a connector assembly constructed in this way, it is ensured that the connection slide 3 may always be pushed fully into the coupling member 1, such that full, durable contacting is ensured at all times.

Due to the defined contacting position of the connector housing 2 in the coupling member 1, established by means of the pegs 5 on the connector housing 2 guided in the channels 4 in the connection slide 3, and the guarantee of full actuation of the connection slide 3 as far as into the snapped-in position thereof in the coupling member 1, a connector assembly formed in such a way is particularly well suited to the connection of optical fibers, since in this way a constant slight distance between the end faces of the optical fibers is ensured.

It is advantageous for over-compression of the housings to be possible without damage to the housings, if the tolerances are such that the connection slide 3 has to be pushed still further into the coupling member 1 in order to reach the snapped-in position. In this case, this deformable area may intentionally deform in the manner of a predetermined weak point, without any risk of the housing material being destroyed.

It is additionally advantageous for the resiliently deformable areas to be sufficiently rigidly constructed to withstand the cable tension arising during operation without contact being lost.

What is claimed is:

1. A connector assembly, especially for connecting optical fibers, comprising:

a coupling member;

a connector housing being insertable into the coupling member; and, a connection slide mounted in the coupling member being actuatable generally perpendicularly to an insertion direction of the connector housing, the connection slide having an angled channel formed therein for guiding the connector housing into a connection position within the coupling member during actuation, a latching mechanism for securing the connector housing in a snapped-in position, and a resiliently deformable area formed by a plurality of spaced apart openings, the resiliently deformable area being deformable when the connector housing is between the connection and snapped-in positions.

2. The connector assembly according to claim 1 wherein the connector housing further comprises pegs for engaging the channels.

3. The connector assembly according to claim 1 wherein the resiliently deformable area, of which there is at least one, is formed as a flexible bar.

4. The connector assembly according to claim 1 wherein the resiliently deformable area is formed as a plurality of flexible bars.

5. The connector assembly according to claim 1 wherein the plurality of spaced apart openings are formed along an edge of the connection slide.

6. The connector assembly according to claim 5 wherein the edge of the connection slide is positioned toward the insertion direction of the connector housing.

7. The connector assembly according to claim 5 wherein the latching mechanism is positioned on an other edge of the connection slide.

8. The connector assembly according to claim 1 wherein the plurality of spaced apart openings are closed on all sides.

9. The connector assembly according to claim 1 wherein the plurality of spaced apart openings are elongated in shape.

10. A connector assembly with a connector position assurance mechanism, comprising:

a coupling member;

a connector housing being insertable into the coupling member; and, a connection slide mounted in the coupling member and being actuatable generally perpendicularly to an insertion direction of the connector housing, the connection slide having an angled channel formed therein for guiding the connector housing into a connection position within the coupling member during actuation, a latching mechanism for securing the connector housing in a snapped-in position, and a flexible bar formed separate from the latching mechanism, the flexible bar provided with an opening such that the flexible bar is resiliently deformable during actuation.

11. The connector assembly of claim 10 wherein the opening is positioned along an edge of the connection slide.

12. The connector assembly of claim 11 wherein the opening is closed on all sides.

13. The connector assembly of claim 10 wherein the connector housing includes pegs for engaging the channels.

14. The connector assembly of claim 10 wherein the flexible bar is formed along a direction of length of the connection slide.

15. The connector assembly of claim 10 wherein the latching mechanism is a catch formed to engage a projection on the coupling member.

* * * * *